(12) United States Patent
Szuecs et al.

(10) Patent No.: US 8,021,720 B2
(45) Date of Patent: Sep. 20, 2011

(54) PROCESS FOR EXTENDING THE CYCLIC SERVICE LIFE OF THERMAL BARRIER COATINGS, IN PARTICULAR ON GAS TURBINE COMPONENTS

(75) Inventors: Frigyes Szuecs, Langenbruck (CH); Alexander Stankowski, Siggenthal-Station (CH)

(73) Assignee: Alstom Technology Ltd, Baden (CH)

( * ) Notice: Subject to any disclaimer, the term of this patent is extended or adjusted under 35 U.S.C. 154(b) by 591 days.

(21) Appl. No.: 12/014,893

(22) Filed: Jan. 16, 2008

(65) Prior Publication Data

US 2008/0171151 A1 Jul. 17, 2008

(30) Foreign Application Priority Data

Jan. 16, 2007 (CH) .................................... 0061/07

(51) Int. Cl.
B05D 3/10 (2006.01)
(52) U.S. Cl. .................. 427/337; 106/287.34; 427/140; 427/331; 427/343; 427/344
(58) Field of Classification Search .................. 427/337, 427/140, 331, 343, 344, 350, 372.2; 3/337; 72/53; 106/287.34
See application file for complete search history.

(56) References Cited

U.S. PATENT DOCUMENTS

| | | | |
|---|---|---|---|
| 3,676,963 A | 7/1972 | Rice et al. | |
| 4,257,743 A | 3/1981 | Fujii | |
| 4,889,589 A | 12/1989 | McComas | |
| 5,073,433 A * | 12/1991 | Taylor | 428/134 |
| 5,558,922 A * | 9/1996 | Gupta et al. | 428/141 |
| 5,614,054 A * | 3/1997 | Reeves et al. | 156/344 |
| 6,284,691 B1 * | 9/2001 | Bruce | 501/103 |
| 6,471,881 B1 * | 10/2002 | Chai et al. | 216/39 |
| 2002/0157277 A1 | 10/2002 | Lipkin et al. | |
| 2004/0247789 A1 | 12/2004 | Boucard et al. | |
| 2005/0158590 A1 | 7/2005 | Li | |

FOREIGN PATENT DOCUMENTS

| | | |
|---|---|---|
| EP | 1295965 A2 | 3/2003 |
| WO | WO-0048751 | 8/2000 |

OTHER PUBLICATIONS

W. Miglietti et al., "Advantages of Fluoride Ion Cleaning at Sub-Atmospheric Pressure", Engineering Failure Analysis, vol. 5, No. 2, pp. 149-169, 1998, XP-002402336.

Steffens, H. D, et al. "Some Aspects of Thick Thermal Barrier Coating Life Prolongation", Journal of Thermal Spray Technology, vol. 4, No. 4, Dec. 1, 1999, pp. 517-522, XP002503760.

Saruhan et al, "Liquid-phase-infiltration of EB-PVD-TBCs with ageing inhibitor", Journal of the European Ceramic Society, Elsevier Science Publishers, Barking, Essex, Great Britain, vol. 26, No. 1-2, Jan. 1, 2006, pp. 49-58, XP005123975.

(Continued)

*Primary Examiner* — Katherine A Bareford
*Assistant Examiner* — Alexander Weddle
(74) *Attorney, Agent, or Firm* — Leydig, Voit & Mayer, Ltd.

(57) ABSTRACT

A process for extending the cyclic service life of thermal barrier coatings made of yttrium-stabilized zirconium oxide (YSZ) or the like which have been applied to a substrate with an oxidizing bond coat in between includes increasing or long-term stabilizing the strain tolerance of the thermal barrier coating.

7 Claims, 1 Drawing Sheet

OTHER PUBLICATIONS

F. Szuecs, "Thermomechanische Analyse und Modellierung plasmagespritzter und EB-PVD aufgedampfter Waermedaemmschicht-Systeme für Gasturbinen", [thermomechanical analysis and modelling of plasma-sprayed and EB-PVD thermal barrier coating systems for gas turbines], VDI Fortschrittsberichte, vol. 5, No. 518, VDI Veilag GmbH Duesseldorf, Germany, pp. 47, 96-102, 1998.

T: L. Anderson, "Facture-Mechanics—Fundamentals and Applications", Second Edition, Department of Mechanical Engeneering, Texas A&M University, College Station, Texas; US, 1994, p. 16.

* cited by examiner

PROCESS FOR EXTENDING THE CYCLIC SERVICE LIFE OF THERMAL BARRIER COATINGS, IN PARTICULAR ON GAS TURBINE COMPONENTS

Priority is claimed to Swiss Patent Application No. CH 00061/07, filed Jan. 16, 2007, the entire disclosure of which is incorporated by reference herein.

The present invention deals with the field of thermal machines. It relates to a process for extending the cyclic service life of thermal barrier coatings, in particular, thermal barrier coatings made of yttrium-stabilized zirconia or related chemical compositions.

BACKGROUND

In thermally stressed gas turbine components, such as for example guide vanes or rotor blades or liners in the combustion chamber, Ni-based superalloys, the surfaces of which are additionally protected by the application of a ceramic thermal barrier coating, are often used in order to reach high operating temperatures and thereby to achieve improved efficiencies. An example of a structure of a component of this type in the form of a turbine blade is illustrated in excerpt form in FIG. 1. A bond coat (BC) 12, for example made of MCrAlY or PtAl, has been applied to the substrate 11 composed of a Ni-base superalloy. The actual thermal barrier coating (TBC) 14 has been applied to the bond coat 12. At high temperatures, a thermally grown oxide layer (TGO) 13 composed predominantly of $\alpha$-$Al_2O_3$ is formed at the interface between thermal barrier coating 14 and bond coat 12, which slows down the oxidation of the bond coat.

The service life of the thermal barrier coating 14 under cyclic oxidation is dependent not only on the thickness of the thermally grown oxide layer 13 (on account of increasing stresses at the interface as the oxidation increases) but also on the strain tolerance of the thermal barrier coating 14. The service life is limited in particular by delamination from the substrate 11.

The mechanical properties of the thermal barrier coating 14 are determined by various mechanisms:

The following are driving forces in the TBC delamination:

A1: transient strains $\epsilon 1$ in the event of thermal shocks (temperature gradients for example when starting up and shutting down a gas turbine) and A2: stationary mismatch strains $\epsilon 2$ (mismatch between the thermal expansions of adjacent layers for example during steady-state gas turbine operation)

A3: intrinsic strains $\epsilon 3$ caused by TGO growth at the TBC/BC interface (oxidation rate of the bond coat 12)

A4: although further strain components (e.g. mechanical) are present, they can substantially be ignored for the use of coated parts in gas turbines.

The result of the local strains A1-A4 is as follows for the local stress $\sigma_{TBC}$ in the TBC:

A5: $\sigma_{TBC} = E_{TBC} \Sigma \epsilon i$, where i=1 . . . 4; $E_{TBC}$: macroscopic modulus of elasticity of the TBC The driving forces in the TBC delamination are in some cases independent of operating time (component A1, A2, A4) and in some cases dependent on operating time (component A3).

Resistance to TBC Delamination:

According to linear fracture mechanism theory, the thermal barrier coating fails as soon as the energy release rate G reaches a critical value $G_C$, where:

B1: $G \geq G_C = \pi(\sigma_{TBC})^2 \, a/E_{TBC} = (K_{IC})^2/E_{TBC}$ with critical crack length a, fracture toughness of the TBC $K_{IC}$ and $\sigma_{TBC}$ according to A5.

(Source: Anderson, T. L.; Fracture Mechanics; 1994; ISBN 0-8493-4260-0; p. 16)

SUMMARY OF THE INVENTION

The thermal barrier coating therefore fails (schematically) as soon as the local stress $\sigma_{TBC}$ (A5) exceeds a critical value defined by B1. A high fracture toughness and a low modulus of elasticity of the TBC accordingly have the effect of lengthening the service life. However, the modulus of elasticity of the thermal barrier coating increases during the operating time as a result of sintering processes. This loss of strain tolerance often constitutes the actual factor that limits the service life of the thermal barrier coating.

The invention is based, in part, on the consideration that the TBC strain tolerance is substantially influenced by what are known as microcontacts in the thermal barrier coating 14 (TBC). These punctiform contact locations in the TBC bridge microcrack flanks, where they transmit the stresses. If these microcontacts are weakened, the cohesion of the TBC is reduced and the TBC becomes more strain-tolerant, and the macroscopic modulus of elasticity drops. If the microcontacts are strengthened, as by sintering processes, the TBC becomes more rigid and for the same imposed strain (A1, . . . A4) the local stresses (A5) rise until the critical energy release rate B1 is reached and the TBC flakes off. This is important in particular if the progressing sintering processes are accelerated by oxidic impurities in the TBC (see in this respect for example the thesis by F. Szücs; Thermomechanische Analyse und Modellierung plasmagespritzter und EB-PVD aufgedampfter Wärmedämmschichtsysteme für Gasturbinen [thermomechanical analysis and modelling of plasma-sprayed and EB-PVD thermal barrier coating systems for gas turbines], VDI Fortschrittsberichte, volume 5, no. 518, VDI Verlag GmbH Düsseldorf, Deutschland, ISBN 3-18351805-8, pages 47, 96-102).

A macroscopic modulus of elasticity, which is reduced relative to thermal barrier coatings that have not undergone any aftertreatment, of plasma-sprayed thermal barrier coatings which have subsequently been infiltrated in aqueous hydrofluoric acid, is described in the abovementioned thesis by F. Szücs on page 104-106. It was in this way possible to demonstrably increase the TBC strain tolerance and cyclic service life of the coating system.

An object of the invention is to provide a process by which the cyclic service life of the thermal barrier coatings on, for example, gas turbine blades and vanes and other components in the hot gas path can be lengthened in a simple way.

The present invention provides a process for extending the cyclic service life of thermal barrier coatings made of yttrium-stabilized zirconia (YSZ) or related chemical compositions, which have been applied to a substrate with an oxidizing bond coat in between, wherein the strain tolerance of the thermal barrier coating is increased and/or long-term stabilized.

In one configuration of the process according to the invention, to increase the strain tolerance of the thermal barrier coating, punctiform contact locations or microcontacts, which bridge microcrack flanks in the thermal barrier coating, are weakened.

In particular, to weaken the microcontacts the $SiO_2$ that is present as an impurity at the inner surface of the open-pore thermal barrier coating, as well as further sinter-active oxidic impurities that are present, are decomposed.

In this case, the decomposition of the SiO$_2$ and of the further sinter-active oxidic impurities that are present is preferably effected chemically.

According to a first alternative, the chemical decomposition of the SiO$_2$ and of the further sinter-active oxidic impurities that are present takes place in the HF-containing gas phase of a fluoride ion cleaning installation.

According to a second alternative, the chemical decomposition of the SiO$_2$ and of the further sinter-active oxidic impurities that are present is effected by means of a hydrofluoric acid solution in vapor form, in particular in an autoclave.

According to a third alternative, the chemical decomposition of the SiO$_2$ and of the further sinter-active oxidic impurities that are present is effected by means of an aqueous hydrofluoric acid solution in a chemical bath.

In particular, the fluoride ion cleaning process is controlled, by means of the parameters partial pressure, HF gas content, temperature and time profile, in such a way that only the microcontacts are selectively weakened.

However, a shot-peening process can also be used to weaken the microcontacts.

Alternatively, a Trowal process is used to weaken the microcontacts.

Alternatively, an infiltration process using a medium, followed by a heat treatment, wherein the infiltrated medium undergoes a volumetric expansion during a liquid-solid phase change, is used to weaken the microcontacts.

A refinement of this variant is characterized in that the infiltration medium is water, which is introduced into the pores in the thermal barrier coating by immersion, spraying or via the gas phase and is briefly frozen by means of liquid nitrogen or dry ice, and in that the infiltration agent is then removed by standard drying or by means of vacuum drying.

In this case, preferably the penetration depth of the infiltration medium is restricted by suitable process parameters to the outer region of the thermal barrier coating, in order to minimize risks of the process having a negative effect on the adhesion of the thermal barrier coating.

The spatial propagation of the freezing operation can also be controlled by targeted dissipation of the heat into the component interior, so that the solidification front, starting from the interface of the thermal barrier coating, is guided in the direction of the surface of the thermal barrier coating, instead of prematurely closing off the porosity from the outside before the solidification has ended and the risks of the process having a negative effect on the adhesion of the thermal barrier coating are minimized.

BRIEF DESCRIPTION OF THE DRAWINGS

The invention is to be explained in more detail below on the basis of exemplary embodiments in conjunction with the drawing, in which.

DETAILED DESCRIPTION

Figure 1:
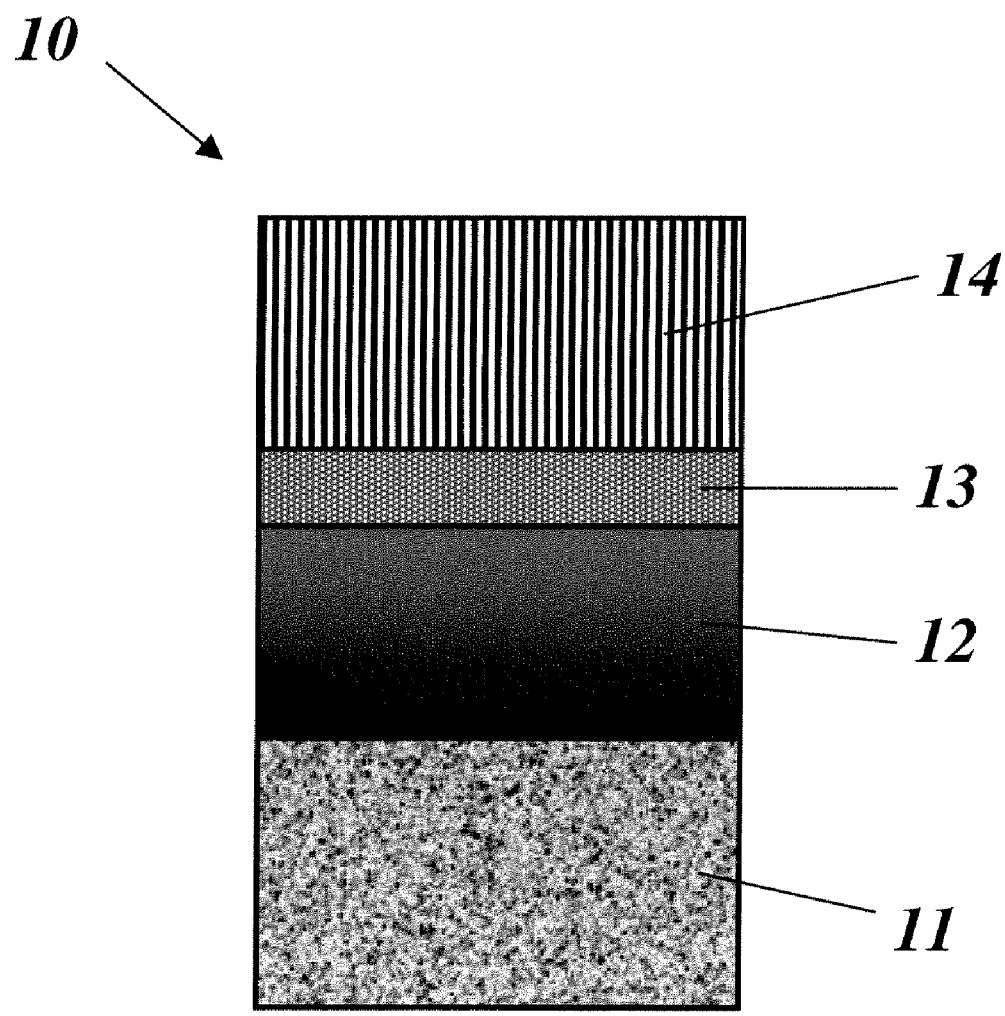
FIG. 1 diagrammatically depicts an excerpt from an example of a surface structure of a gas turbine blade with thermal barrier coating.

As has already been mentioned, in the context of the invention the thermal barrier coating 14 (the TBC) is to be made more strain-tolerant and sintering of the TBC in operation is to be minimized, without adversely affecting the adhesion of the layer. It is in this way possible to lengthen the cyclic service life of the thermal barrier coating. It is in this way possible to realize a higher number of cycles at the same operating temperature or a higher operating temperature for the same number of cycles.

In this context, the TBC strain tolerance is substantially influenced by what are known as microcontacts in the thermal barrier coating 14. Since the thermal barrier coating has an open-pore structure, the microcontacts are accessible to gases and/or liquids. This fact is exploited in the context of the invention in order to attack and weaken the microcontacts using chemical, mechanical and physical methods. The microcontacts in the TBC can be attacked by means of the following methods:

a. By means of HF gas phase in a fluoride ion cleaning (FIC) installation. An installation of this type and the processes which it can be used to carry out are disclosed for example in US-A1-2002/157277.

b. By means of hydrofluoric acid solution in vapor form, for example in an autoclave.

c. By means of aqueous hydrofluoric acid solution in a chemical bath.

d. By means of mild shot-peening of the TBC-coated surface, if appropriate in combination with smoothing of the TBC.

e. By means of the Trowal in combination with smoothing of the TBC.

f. By means of infiltration of a liquid which on solidification weakens the microcontacts on account of a volumetric expansion.

In this context, the process used should be selected in such a way that:

the TGO 13 is not attacked and the adhesion to the bond coat 12 remains unaffected;

the SiO$_2$ that is present as an impurity at the inner surface of the TBC, as well as further oxidic impurities, which are significantly involved in the progressing sintering process, are selectively decomposed;

destabilization of the partially stabilized Y$_2$O$_3$—ZrO$_2$ crystal (bulk) is avoided the TBC layer thickness remains substantially unchanged; and damage to regions that are not TBC coated (blade or vane interior and regions with a metallic protective coating) is avoided.

The invention can in general terms be employed in regions in which the TBC flakes off prematurely and this has the effect of limiting service life or increasing the failure rate or repair/reconditioning costs as a result of the TBC flaking off prematurely. Experience has shown that flaking of this nature occurs in particular at rotor blades or guide vanes in the first or second row of a gas turbine and at entry segments or inlet segments of silo combustion chambers.

The invention is of particular interest for the development of retrofit solutions, in which an increase in service life can be achieved without changing the component casting and options for optimizing the coating have largely already been fully exploited.

What is claimed is:

1. A process for extending the cyclic service life of a thermal barrier coating made of a chemical thermal barrier coating composition, which has been applied to a substrate with an oxidizing bond coat in between, the thermal barrier coating includes microcracks, which are bridged by punctiform contact locations, the process comprising:

improving a strain tolerance of the thermal barrier coating by weakening the punctiform contact locations in the thermal barrier coating, wherein the thermal barrier coating is an open-pore coating having $SiO_2$ as an impurity at an inner surface of the open-pore coating and further sinter-active oxidic impurities, and wherein the weakening of the punctiform contact locations includes decomposing the $SiO_2$ and further sinter-active oxidic impurities.

2. The process as recited in claim 1, wherein the decomposing is effected chemically.

3. The process as recited in claim 2, wherein the decomposing is performed in an HF-containing gas phase of a fluoride ion cleaning installation.

4. The process as recited in claim 3, further comprising conducting a fluoride ion cleaning process using partial pressure, HF gas content, temperature and time profile, in such a way that only the microcontacts are selectively weakened.

5. The process as recited in claim 2, wherein the decomposing is effected using a hydrofluoric acid solution in vapor form.

6. The process as recited in claim 5, wherein the decomposing is performed in an autoclave.

7. The process as recited in claim 2, wherein the decomposing is effected using an aqueous hydrofluoric acid solution in a chemical bath.

* * * * *